(12) United States Patent
Ishikawa et al.

(10) Patent No.: US 12,110,213 B2
(45) Date of Patent: Oct. 8, 2024

(54) GUIDE DISPLAY DEVICE, AND CRANE PROVIDED WITH SAME

(71) Applicants: TADANO LTD., Kagawa (JP); THE SCHOOL CORPORATION KANSAI UNIVERSITY, Osaka (JP)

(72) Inventors: Iwao Ishikawa, Kagawa (JP); Takayuki Kosaka, Kagawa (JP); Keita Mashima, Kagawa (JP); Satoshi Kubota, Osaka (JP); Shigenori Tanaka, Osaka (JP); Masaya Nakahara, Osaka (JP); Koki Nakahata, Osaka (JP)

(73) Assignees: TADANO LTD., Kagawa (JP); THE SCHOOL CORPORATION KANSAI UNIVERSITY, Osaka (JP)

( * ) Notice: Subject to any disclaimer, the term of this patent is extended or adjusted under 35 U.S.C. 154(b) by 172 days.

(21) Appl. No.: 17/911,315

(22) PCT Filed: Mar. 23, 2021

(86) PCT No.: PCT/JP2021/012010
§ 371 (c)(1),
(2) Date: Sep. 13, 2022

(87) PCT Pub. No.: WO2021/193642
PCT Pub. Date: Sep. 30, 2021

(65) Prior Publication Data
US 2023/0055311 A1   Feb. 23, 2023

(30) Foreign Application Priority Data

Mar. 26, 2020 (JP) .................................. 2020-056814

(51) Int. Cl.
*G06T 7/20* (2017.01)
*B66C 13/46* (2006.01)
(Continued)

(52) U.S. Cl.
CPC ................. *B66C 13/46* (2013.01); *G06T 7/20* (2013.01); *G06T 7/66* (2017.01); *G06T 17/05* (2013.01);
(Continued)

(58) Field of Classification Search
CPC .. G06T 7/66; G06T 7/20; G06T 17/05; G06T 2207/10028; G06T 2210/56; B66C 13/46
See application file for complete search history.

(56) References Cited

U.S. PATENT DOCUMENTS

| 10,584,016 B2 * | 3/2020 | Laitasalmi .............. G06T 7/344 |
| 2020/0198939 A1 * | 6/2020 | Kosaka .................. B66C 15/065 |
| 2021/0147194 A1 | 5/2021 | Kosaka et al. |

FOREIGN PATENT DOCUMENTS

| CA | 2836697 A1 * | 11/2012 | ............. B63B 27/30 |
| JP | 2002-366977 A | 12/2002 | |

(Continued)

OTHER PUBLICATIONS

"Ground plane estimation from sparse LIDAR data for loader crane sensor fusion system." Miadlicki et al. Aug. 2017 DOI: 10.1109/MMAR.2017.8046916 Conference: 2017 22nd International Conference on Methods and Models in Automation and Robotics (MMAR). (Year: 2017).*

(Continued)

*Primary Examiner* — Antonio A Caschera
(74) *Attorney, Agent, or Firm* — Paratus Law Group, PLLC

(57) ABSTRACT

A guide display device of a crane including a data processing unit that creates a plurality of surfaces using point cloud data, which is acquired by a laser scanner from above a hung load and which includes the hung load, and creates a three-dimensional map according to the plurality of surfaces, the three-dimensional map being created for each (Continued)

prescribed period, wherein the data processing unit is configured to set a reference position at the hung load in the three-dimensional map and also set a current surface present within a prescribed distance from a past reference position as the surface of the hung load, thereby tracking the hung load in the three-dimensional map.

6 Claims, 14 Drawing Sheets

(51) Int. Cl.
 *G06T 7/66* (2017.01)
 *G06T 17/05* (2011.01)
(52) U.S. Cl.
 CPC .............. *G06T 2207/10028* (2013.01); *G06T 2210/56* (2013.01)

(56) References Cited

FOREIGN PATENT DOCUMENTS

| | | |
|---|---|---|
| JP | 2012-073856 A | 4/2012 |
| JP | 2019-023774 A | 2/2019 |
| JP | 2019-024150 A | 2/2019 |

OTHER PUBLICATIONS

Mar. 15, 2024, European Search Report issued for related EP Application No. 21774541.3.
Jun. 8, 2021, International Search Report issued for related PCT Application No. PCT/JP2021/012010.
Jun. 8, 2021, International Search Opinion issued for related PCT Application No. PCT/JP2021/012010.

* cited by examiner

GUIDE DISPLAY DEVICE, AND CRANE PROVIDED WITH SAME

CROSS REFERENCE TO PRIOR APPLICATION

This application is a National Stage Patent Application of PCT International Patent Application No. PCT/JP2021/012010 (filed on Mar. 23, 2021) under 35 U.S.C. § 371, which claims priority to Japanese Patent Application No. 2020-056814 (filed on Mar. 26, 2020), which are all hereby incorporated by reference in their entirety.

TECHNICAL FIELD

The present invention relates to a guide display device and a crane including the same.

BACKGROUND ART

In the related art, a guide display device that can present information related to positions and altitudes of a lifting cargo and a ground object around the lifting cargo to the operator is publicly known. Such a guide display device is disclosed in PTL 1.

The guide display device disclosed in PTL 1 includes a data processing section that creates a plurality of planes by using point group data acquired by a laser scanner and creates a three-dimensional map with the plurality of planes. The data processing section generates a guide information such as a guide frame diagram surrounding the lifting cargo and the ground object, and displays the guide information in a superimposed manner on the image captured by the camera on a data display section. With such a guide display device, the information related to positions and altitudes of the lifting cargo and the ground object around the lifting cargo can be presented to the operator.

CITATION LIST

Patent Literature

PTL 1
Japanese Patent Application Laid-Open No. 2019-24150

SUMMARY OF INVENTION

Technical Problem

In the guide display device disclosed in PTL 1, the operator designates the lifting cargo on the image, and the surface located at the designated position is set as the top surface of the lifting cargo. As such, in the case where the lifting cargo largely sways and the like, the lifting cargo may be deviated from the designated position. When the lifting cargo is deviated from the designated position, the guide information of the lifting cargo is not appropriately displayed, which may put a burden on the operator operating the crane. In view of this, there is a demand for a guide display device and a crane including the same that can track the lifting cargo and display the guide information.

To solve the above-described problems, an object of the present invention is to provide a guide display device that can track the lifting cargo and display the guide information. In addition, another object is to provide a crane including such a guide display device.

Solution to Problem

The problems to be solved by the present invention are as described above, and a solution to the problems is described below.

The first invention is a guide display device of a crane, includes: a data processing section configured to create a plurality of planes by using point group data including a lifting cargo acquired with a laser scanner from above the lifting cargo, create a three-dimensional map with the plurality of planes, and create the three-dimensional map at a predetermined time interval, the data processing section sets a reference position to the lifting cargo in the three-dimensional map, and the data processing section tracks the lifting cargo in the three-dimensional map by setting a current plane located within a predetermined distance from a past reference position as a surface of the lifting cargo.

In the second invention, in the guide display according to the first invention, the data processing section sets the reference position to a gravity center of the lifting cargo in the guide display device according the first invention.

In the third invention, in the guide display according to the second invention, the point group data is data including the ground surface acquired with the laser scanner from above the ground surface, and the data processing section sets, as a height of the lifting cargo, a difference in an altitude value between the ground surface and the lifting cargo in the three-dimensional map when the lifting cargo is placed on the ground surface, and calculates the gravity center of the lifting cargo by using the height of the lifting cargo in the guide display device according the second invention.

In the fourth invention, in the guide display according to the second or third invention, the point group data is data including a ground object acquired with the laser scanner from above the ground object; and the data processing section sets, as the height of the lifting cargo, the difference in the altitude value between the ground object and the lifting cargo in the three-dimensional map when the lifting cargo is placed on the ground object, and calculates the gravity center of the lifting cargo by using the height of the lifting cargo in the guide display device according the second or third invention.

In the fifth invention, in the guide display according to the first to fourth inventions, when tracking of the lifting cargo in the three-dimensional map fails, the data processing section tracks, through image analysis, the lifting cargo in an image including the lifting cargo captured with a camera from above the lifting cargo in the guide display device according the first to fourth inventions.

The sixth invention is a crane including the guide display device according to any one of the first to fifth inventions.

Advantageous Effects of Invention

Effects of the present invention are as described below.

The guide display device according to the first invention sets the reference position to the lifting cargo in the three-dimensional map, and sets a current surface located within a predetermined distance from the past reference position as the surface of the lifting cargo to thereby track the lifting cargo in the three-dimensional map. With such a guide display device, the guide information can be displayed through tracking of the lifting cargo.

The guide display device according to the second invention sets the reference position to the gravity center of the lifting cargo. With such a guide display device, the surface located within the predetermined distance from the gravity center of the lifting cargo is set as the surface of the lifting cargo, and thus the surface of the lifting cargo can be more correctly set while achieving the above-described effects.

The guide display device according to the third invention acquires point group data including the ground surface from above the ground surface, sets, as the height of the lifting cargo, the difference in altitude value between the ground surface and the lifting cargo in the three-dimensional map when the lifting cargo is placed on the ground surface, and calculates the gravity center of the lifting cargo by using the height of the lifting cargo. With such a guide display device, the height of the lifting cargo can be automatically set when the lifting cargo is placed on the ground surface, while achieving the above-described effects.

The guide display device according to the fourth invention acquires the point group data including the ground object from above the ground object, sets, as the height of the lifting cargo, the difference in altitude value between the ground object and the lifting cargo in the three-dimensional map when the lifting cargo is placed on the ground object, and calculates the height of the lifting cargo by using the gravity center of the lifting cargo. With such a guide display device, the height of the lifting cargo can be automatically set even when the lifting cargo is placed on the ground object such as the cargo bed of a truck, while achieving the above-described effects.

When the tracking of the lifting cargo in the three-dimensional map fails, the guide display device according to the fifth invention tracks, through image analysis, the lifting cargo in the image including the lifting cargo captured from above the lifting cargo. With such a guide display device, the guide information can be displayed through tracking of the lifting cargo even when the point group data of the lifting cargo cannot be acquired, while achieving the above-described effects.

The crane according to the sixth invention includes the guide display device according to the first to fifth inventions. With such a crane, an effect similar to the above-described effect can be achieved.

DESCRIPTION OF EMBODIMENTS

First, crane 1 according to the first embodiment of the present invention is described.

Figure 1:
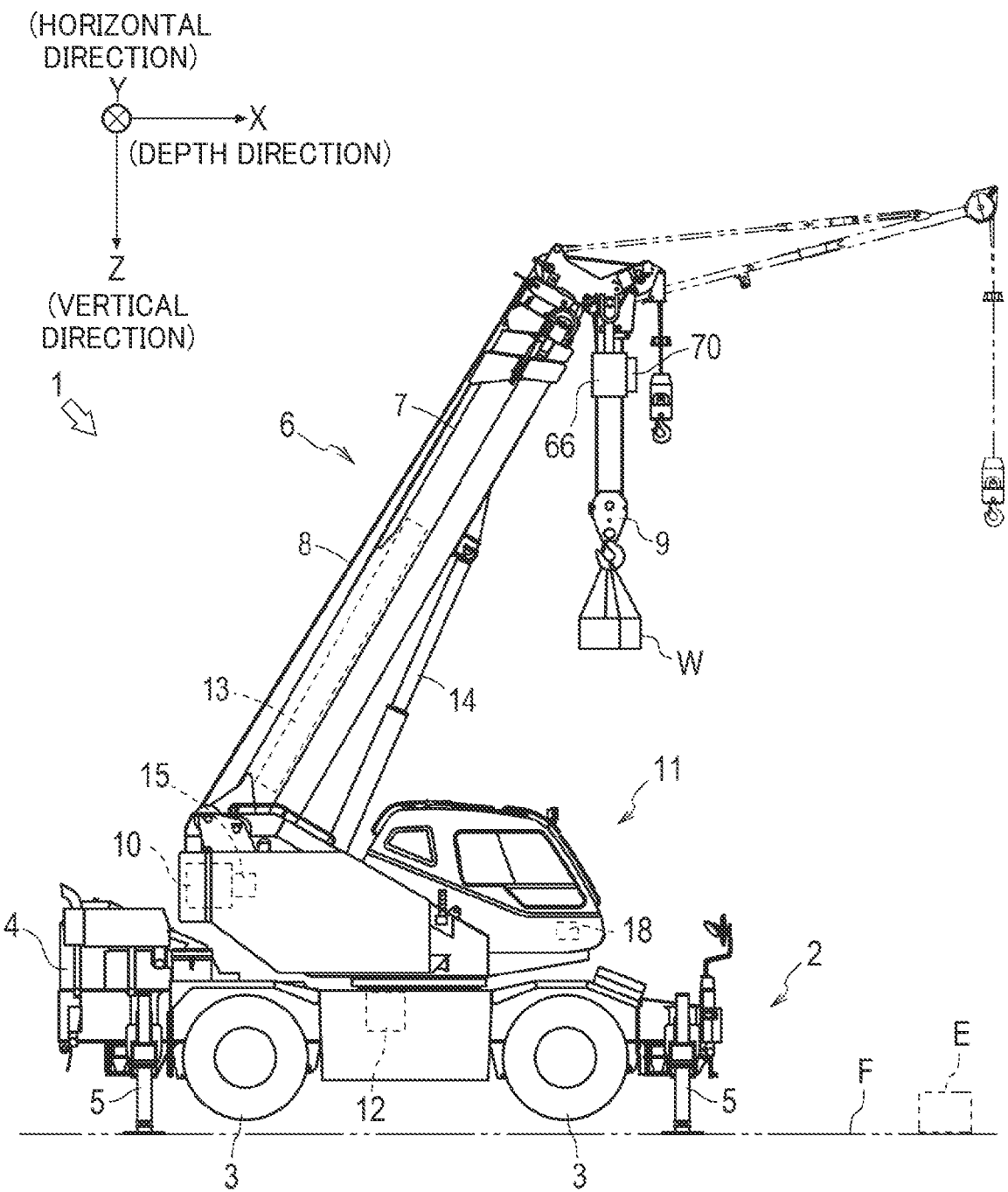
FIG. 1 is a diagram illustrating a crane according to an embodiment of the present invention.

As illustrated in FIG. 1, crane 1 is a mobile crane that can move to an unspecified location. Crane 1 includes travelling vehicle 2 and crane apparatus 6.

Travelling vehicle 2 transports crane apparatus 6. Travelling vehicle 2 includes a plurality of wheels 3, and travels with engine 4 as the power source. Travelling vehicle 2 is provided with outrigger 5. Outrigger 5 is composed of a beam that extends in the width direction of travelling vehicle 2 and a jack cylinder that is grounded on ground surface F to support travelling vehicle 2.

Crane apparatus 6 transports lifting cargo W in a lifted state. Crane apparatus 6 includes boom 7. Wire rope 8 is provided across boom 7. Hook 9 is attached at wire rope 8 that hangs from the end portion of boom 7. In addition, winch 10 is disposed near the proximal end side of boom 7. Note that crane apparatus 6 includes cabin 11 on the lateral side of boom 7. Swinging operation tool 19, expanding/retracting operation tool 20, luffing operation tool 21, winding operation tool 22 and the like are provided inside cabin 11 (see FIG. 2).

Boom 7 is swivelable by an actuator. In the subject application, this actuator is defined as swinging motor 12. Swinging motor 12 is appropriately operated by swinging valve 23, which is an electromagnetic proportional switching valve (see FIG. 2). Specifically, swinging motor 12 appropriately operates when swinging valve 23 switches the flow rate and flow direction of the operation oil. Note that swinging valve 23 operates based on an instruction of control apparatus 18. The swinging angle of boom 7 is detected by swinging sensor 27 (see FIG. 2).

In addition, boom 7 can be extended and retracted by an actuator. In the subject application, this actuator is defined as extending/retracting cylinder 13. Extending/retracting cylinder 13 is appropriately operated by extending/retracting valve 24, which is an electromagnetic proportional switching valve (see FIG. 2). Specifically, extending/retracting cylinder 13 appropriately operates when extending/retracting valve 24 switches the flow rate and flow direction of the operation oil. Note that extending/retracting valve 24 operates based on an instruction of control apparatus 18. The expansion/retraction length of boom 7 is detected by extending/retracting sensor 28 (see FIG. 2).

Further, boom 7 can be freely raised and lowered by an actuator. In the subject application, this actuator is defined as luffing cylinder 14. Luffing cylinder 14 is appropriately operated by luffing valve 25, which is an electromagnetic proportional switching valve (see FIG. 2). Specifically, luffing cylinder 14 appropriately operates when luffing valve 25 switches the flow rate and flow direction of the operation oil. Note that luffing valve 25 operates based on an instruction of control apparatus 18. The luffing angle of boom 7 is detected by luffing sensor 29 (see FIG. 2).

Additionally, hook 9 can be rifted and lowered by the actuator. In the subject application, this actuator is defined as winding motor 15. Winding motor 15 is appropriately operated by winding valve 26, which is an electromagnetic proportional switching valve (see FIG. 2). Specifically, winding motor 15 appropriately operates when winding valve 26 switches the flow rate and flow direction of the operation oil. Note that winding valve 26 operates based on an instruction of control apparatus 18. The hanging length of hook 9 is detected by winding sensor 30 (see FIG. 2).

Incidentally, in the subject application, the XYZ coordinate system is defined with respect to crane 1. The X-axis direction (also referred to as depth direction) in the XYZ coordinate system is a direction perpendicular to the axis direction of the luffing fulcrum of boom 7 and perpendicular to the gravity direction. In addition, the Y-axis direction (also referred to as horizontal direction) in the XYZ coordinate system is a direction parallel to the axis direction of the luffing fulcrum of boom 7 and perpendicular to the gravity direction. Further, the Z-axis direction (also referred to as vertical direction) in the XYZ coordinate system is a direction perpendicular to the axis direction of the luffing fulcrum of boom 7 and parallel to the gravity direction.

Next, guide display device (guide display system) 50 according to an embodiment of the present invention is described.

Figure 2:
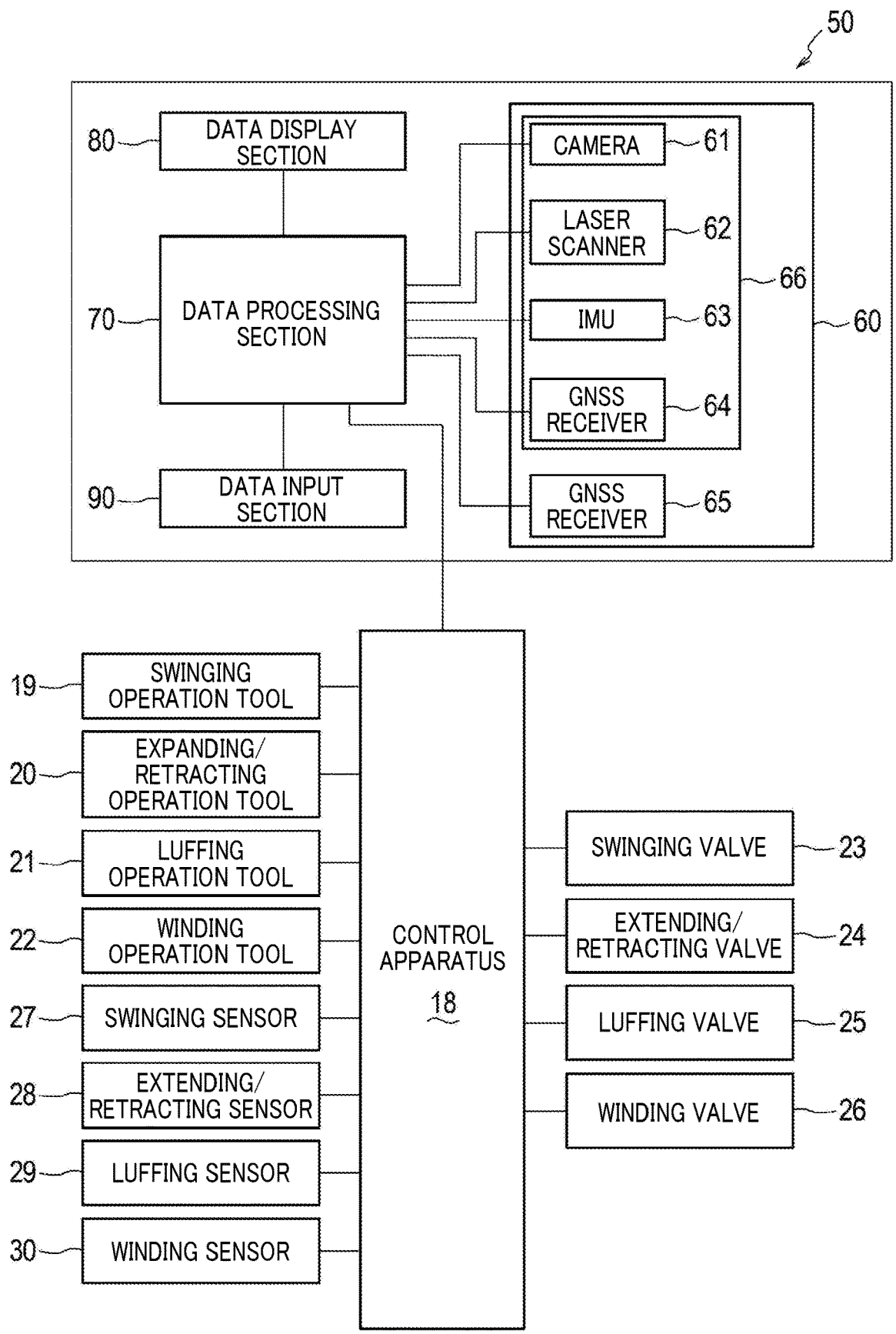
FIG. 2 is a diagram illustrating a guide display device according to an embodiment of the present invention.

As illustrated in FIG. 2, guide display device 50 is linked to control apparatus 18 of crane 1. Guide display device 50 includes data acquiring section 60, data processing section 70, data display section 80 and data input section 90.

Data acquiring section 60 acquires information required for generating guide information described later. Data acquiring section 60 includes sensor unit 66 composed of camera 61, laser scanner 62, inertia measurement unit 63 and first positioning apparatus 64 integrated with each other. Sensor unit 66 is attached at the end portion of boom 7 through a gimbal (see FIG. 1).

Camera 61 captures a part of the work area. Camera 61 outputs captured image i (see FIG. 8A) to data processing section 70. Note that camera 61 captures image i including lifting cargo W and ground surface F (including ground object E) around lifting cargo W from above lifting cargo W. Thus, data processing section 70 acquires images i of lifting cargo W and ground surface F (including ground object E) around lifting cargo W.

Figure 3A:
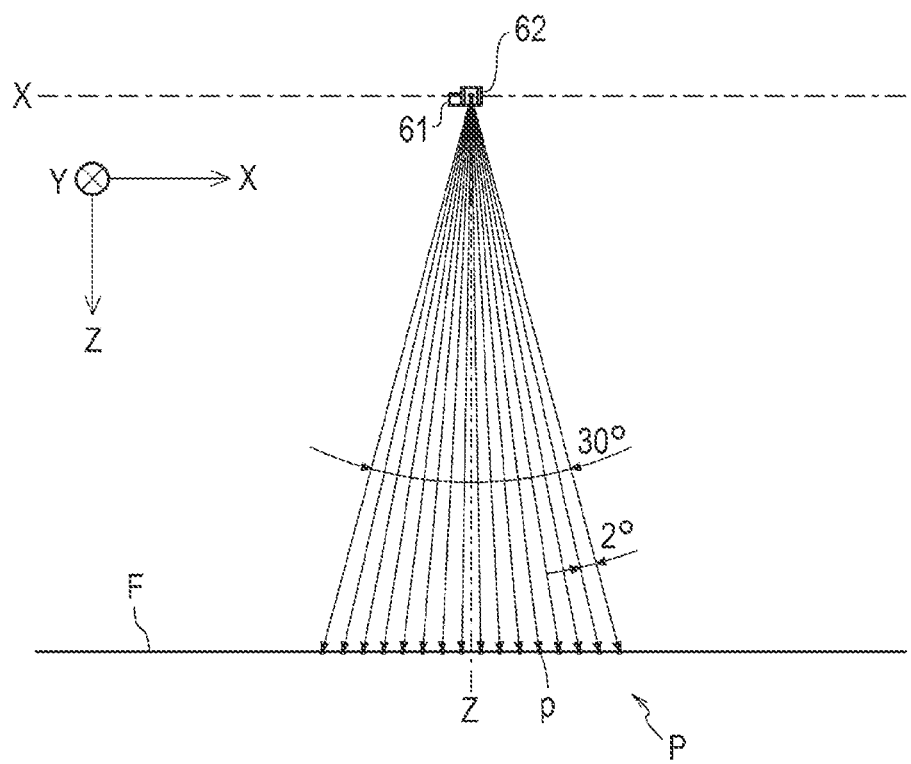
FIG. 3 is a diagram illustrating scanning with a laser scanner.
Figure 3B:
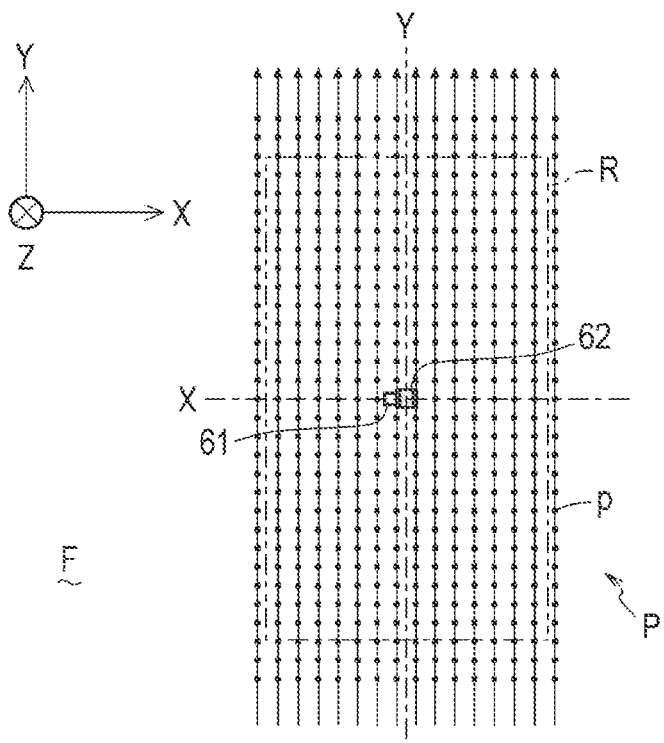

Laser scanner 62 acquires point group data P for a part of the work area (see FIG. 3). Laser scanner 62 outputs the acquired point group data P to data processing section 70. Note that laser scanner 62 scans lifting cargo W and ground surface F (including ground object E) around lifting cargo W from above lifting cargo W. Specifically, laser scanner 62 acquires point group data P including ground surface F (including ground object E) and lifting cargo W located in a part of the work area. Thus, data processing section 70 can acquire point group data P of lifting cargo W and ground surface F (including ground object E) around lifting cargo W.

Inertia measurement unit (hereinafter referred to as "IMU") 63 acquires information related to the posture of sensor unit 66 (more specifically, information related to the postures of camera 61 and laser scanner 62). IMU 63 outputs the acquired information related to the postures of camera 61 and laser scanner 62 to data processing section 70. Thus, data processing section 70 can acquire the information related to the postures of camera 61 and laser scanner 62.

First positioning apparatus (Global Navigation Satellite System, hereinafter referred to as "GNSS receiver") 64 acquires the latitude, the longitude and the altitude value (more specifically, the coordinate value of laser scanner 62) of sensor unit 66 by receiving radio waves emitted from the GNSS satellite. GNSS receiver 64 outputs the acquired coordinate value of laser scanner 62 to data processing section 70. Thus, data processing section 70 can acquire the coordinate value of laser scanner 62.

Additionally, in data acquiring section 60, second positioning apparatus 65 is disposed at the swinging center position of crane apparatus 6. Second positioning apparatus (Global Navigation Satellite System, hereinafter referred to as "GNSS receiver") 65 acquires the latitude, the longitude and the altitude value (more specifically, the coordinate value of the swinging center of crane apparatus 6) of the swinging center of crane apparatus 6 by receiving radio waves emitted from the GNSS satellite. GNSS receiver 65 outputs the acquired swinging center coordinate value to data processing section 70. Thus, data processing section 70 can acquire the coordinate value of the swinging center of crane apparatus 6.

In this manner, with the coordinate value of laser scanner 62 and the coordinate value of the swinging center of crane apparatus 6, guide display device 50 makes up a GNSS compass with boom 7 as the bassline. Thus, data processing section 70 can calculate the orientation of laser scanner 62.

In addition, in guide display device 50, it is preferable that the measurement time of IMU 63 and point group data P be synchronized at the time of the atomic clock of the GNSS satellite (hereinafter referred to as "GNSS time"). Note that GNSS receiver 64 and GNSS receiver 65, with high measurement accuracy real time kinematic (RTK) positioning system employ. It should be noted that the RTK positioning system is not limitative, and other positioning systems may be employed.

Data processing section 70 is connected to data acquiring section 60, and performs various processes. Data processing section 70 is composed of a general-purpose computer, for example. Note that data processing section 70 is disposed near sensor unit 66. It should be noted that data processing section 70 may be disposed at other locations such as inside cabin 11. Naturally, it may be portable.

Data display section 80 is connected to data processing section 70, and displays various information. Data display section 80 is composed of a general-purpose monitor, for example. Note that data display section 80 is disposed inside cabin 11. Thus, the information can be provided to the operator of crane 1. Naturally, in the case where data processing section 70 is portable or the like, it may be an integrated monitor.

Data input section 90 is connected to data processing section 70, and configured to input various numerical values or change the setting. Data input section 90 is composed of a general-purpose keyboard, mouse, or touch panel. Note that data input section 90 is also disposed inside cabin 11. Thus, the operator of crane 1 can freely input numerical values or change the setting. Naturally, in the case where data processing section 70 is portable or the like, it may be an integrated keyboard, mouse, or touch panel.

Next, scanning with laser scanner 62 is described.

As illustrated in FIG. 3, laser scanner 62 irradiates ground surface F with laser light from above. Laser scanner 62 includes a plurality of laser transmitters and laser receivers, and can simultaneously emit a plurality of laser beams and simultaneously acquire a plurality of pieces of point data p (a set of point data p is point group data P).

To be more specific, laser scanner 62 includes a total of 16 laser transmitters, and can simultaneously emit 16 laser beams. The irradiation angles of the laser transmitters are different from each other by 2 degrees around in the Y-axis direction. In addition, the laser transmitters are configured to be able to perform the emission while continuously changing the phase angle around the X axis. Thus, laser scanner 62 can irradiate a predetermined range of ground surface F with laser light.

Further, laser scanner 62 includes a total of 16 laser receivers, and can simultaneously detect reflection light of 16 laser beams. The irradiation angles of the laser receivers are different from each other by 2 degrees around the Y-axis direction. In addition, each laser receiver is configured to be able to detect the reflection light at the same light path as that of the laser light transmitted from the laser transmitter. In this manner, laser scanner 62 can acquire point group data P covering ground surface F. Note that the range where point group data P can be acquired includes measurement region R, which is the range captured by camera 61.

With this configuration, data processing section 70 can acquire point group data P for the range including measurement region R. Laser scanner 62 scans lifting cargo W and ground surface F (including ground object E) around lifting cargo W from above lifting cargo W, and thus point group data P indicates lifting cargo W, ground surface F, and ground object E (see FIG. 8B). Various information acquired by IMU 63 and GNSS receivers 64 and 65 is added to each point data p making up point group data P. Examples of such information include posture information and location information.

Next, a procedure of a process of data processing section 70 is described.

Figure 4:
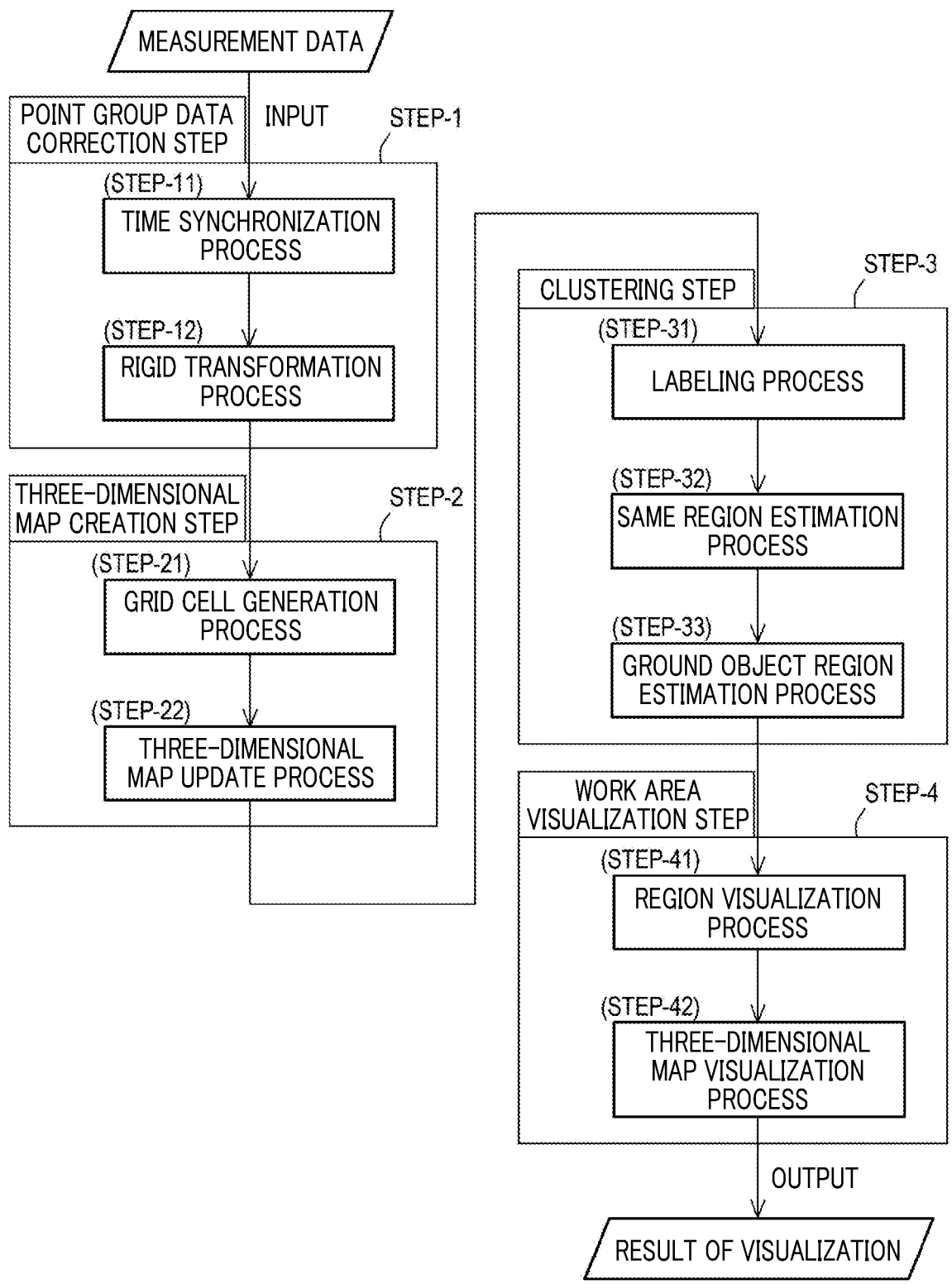
FIG. 4 is a flow chart illustrating a procedure of a process of a data processing section.

As illustrated in FIG. 4, data processing section 70 performs point group data correction step STEP-1, three-dimensional map creation step STEP-2, clustering step STEP-3 and work area visualization step STEP-4. These steps are repeated every predetermined time (one frame time). Note that the frame means three-dimensional map M created based on point group data P of a certain time point (see FIG. 8B).

Figure 5:
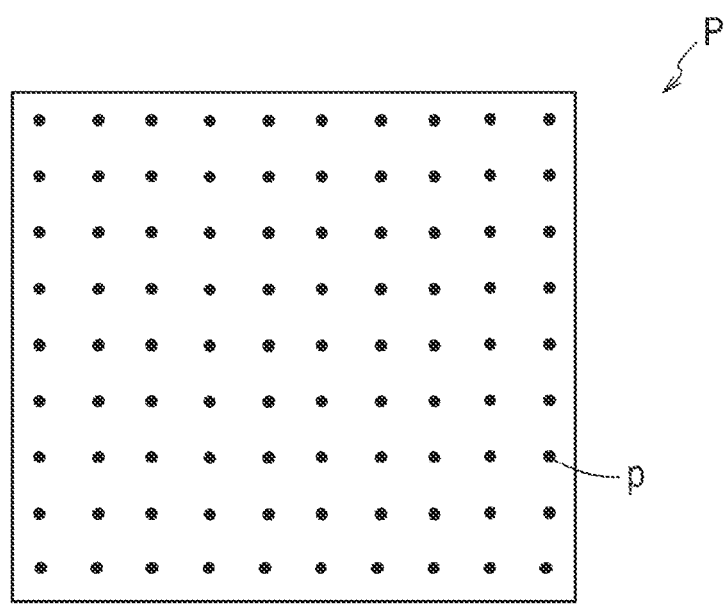
FIG. 5 is a diagram illustrating an overview of a point group data correction step.

At point group data correction step STEP-1, the point group data P, posture information and location information of the time point closest to the current time are acquired on the basis of the information of laser scanner 62, IMU 63 and GNSSs 64 and 65, and the orientation of laser scanner 62 is calculated. Then, by using the posture information, location information and orientation, the position and inclination of point group data P are corrected, and are output as corrected point group data P (see FIG. 5).

To be more specific, point group data correction step STEP-1 is composed of time synchronization process STEP-11 and rigid transformation process STEP-12.

At time synchronization process STEP-11, at the time closest to the current time, the information of IMU 63, GNSSs 64 and 65 and laser scanner 62 that has run from one end to the other in measurement region R are synchronized at the GNSS time. Then, the combination of the synchronized point data p, posture information, and location information are output.

At rigid transformation process STEP-12, one combination of the synchronized point data p, posture information, and location information is acquired. Then, rigid transformation of the coordinate value of point data p is performed by using the acquired posture information, the coordinate system of point data p is converted into a plane right angle coordinate system, and point group data P with the corrected inclination, position and orientation is output.

Figure 6A:
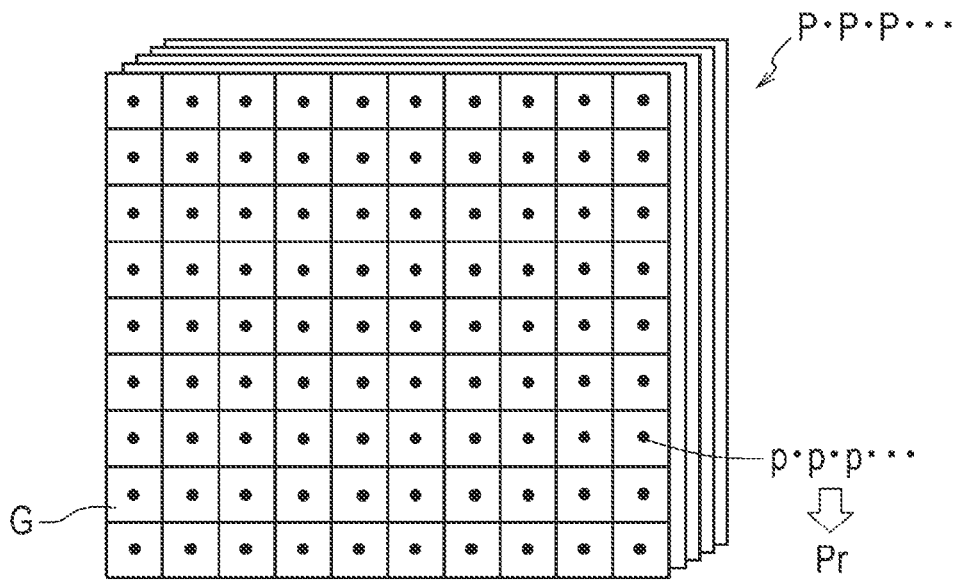
FIG. 6 is a diagram illustrating an overview of a three-dimensional map creation step.
Figure 6B:
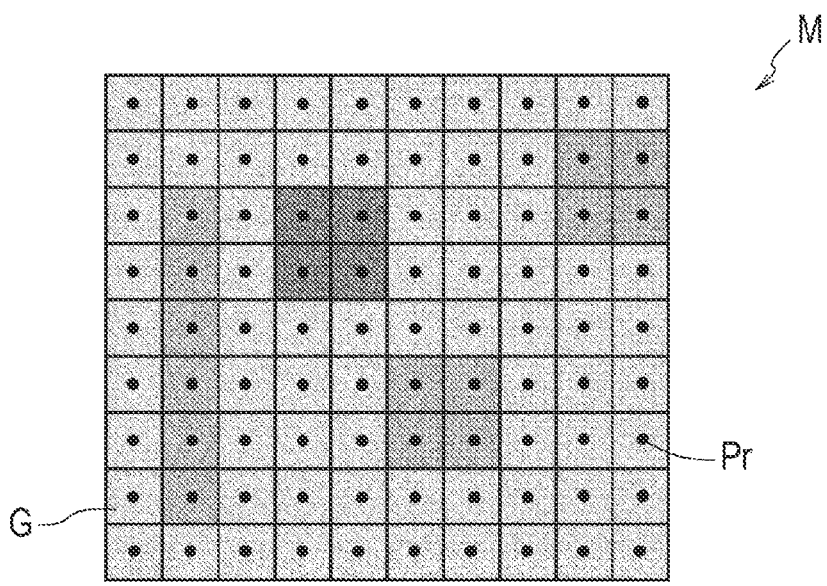

At three-dimensional map creation step STEP-2, corrected point group data P acquired at different times and positions are superimposed on one another and divided into grid cells G of a grid form (a region divided into a grid including a plurality of pieces of point data p), and representative point Pr is calculated for each grid cell G (see FIG. 6A). Then, a plane is created based on representative point Pr, and thus it is output as three-dimensional map M of the work area (see FIG. 6B). Specifically, a plurality of planes is created by using point group data P and three-dimensional map M is created with the plurality of planes.

To be more specific, three-dimensional map creation step STEP-2 is composed of grid cell generation process STEP-21 and three-dimensional map update process STEP-22.

At grid cell generation process STEP-21, corrected point group data P is superimposed on one another and divided into grid cells G of a grid form. Then, the average value of the altitude value of point data p included in grid cell G (the height component of the coordinate value) is calculated, representative point Pr with the average height component value is set at the gravity center of grid cell G Three-dimensional map update process STEP-22 acquires representative point Pr set anew for each grid cell G. In addition, it also acquires existing representative point Pr set at the last time. Then, when representative point Pr set anew and existing representative point Pr are different from each other, a plane based on representative point Pr set anew is created and three-dimensional map M is output.

Figure 7A:
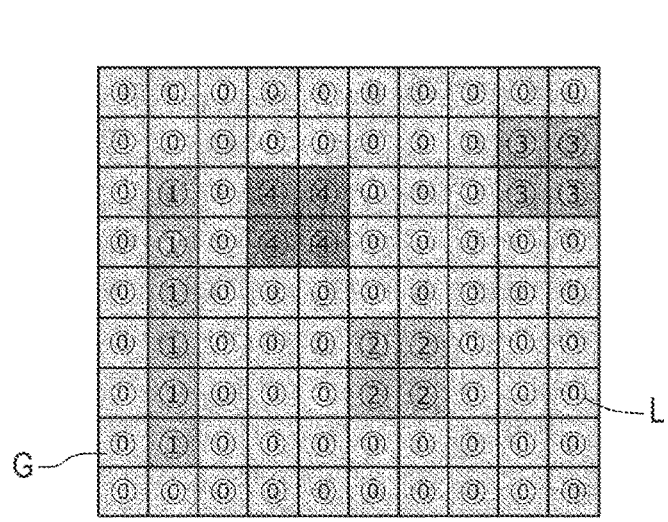
FIG. 7 is a diagram illustrating an overview of a clustering step.
Figure 7B:
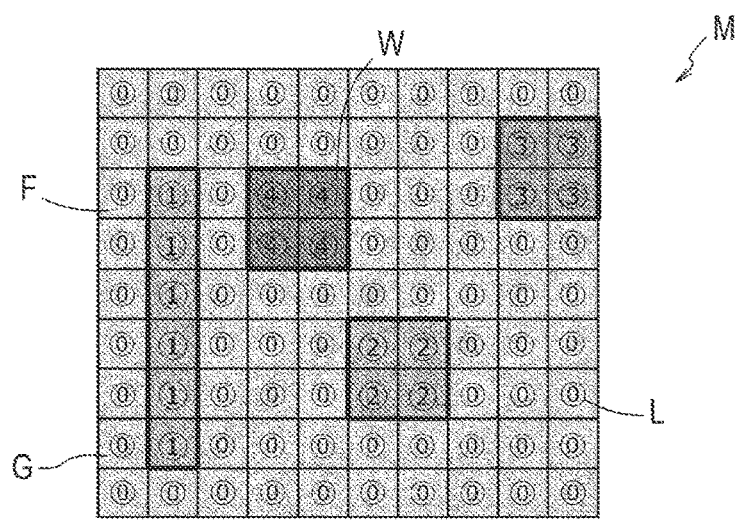
Figure 7C:
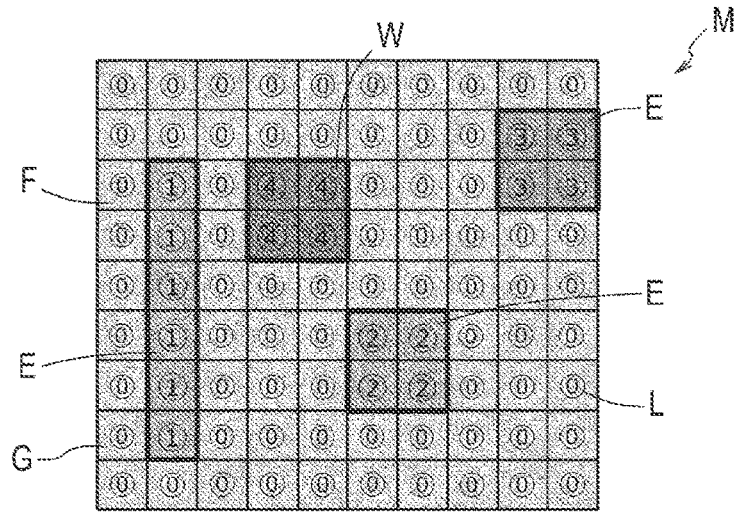

At clustering step STEP-3, label L is provided to the identification region on the basis of the relationship of the height components of representative points Pr regarding representative points Pr of adjacent grid cells G on the upper, lower, left and right sides (see FIG. 7A). Note that the circled numbers illustrated in FIG. 7A and the like represent labels L. Then, among the identification regions provided with the same label L, the identification region corresponding to lifting cargo W is output as lifting cargo W, and the identification region corresponding to ground surface F is output as ground surface F (see FIG. 7B). Further, the other identification regions are output as ground object E (see FIG. 7C).

To be more specific, clustering step STEP-3 is composed of labeling process STEP-31, same region estimation process STEP-32 and ground object region estimation process STEP-33.

At labeling process STEP-31, grid cells G arranged in a grid are assumed to be pixels. In addition, the height component of representative point Pr in each grid cell G is assumed to be the luminance value. Further, the luminance values of adjacent grid cells G on the upper, lower, left and right sides are compared with each other based on a predetermined rule, and label L is provided to the identification region.

At same region estimation process STEP-32, the identification regions provided with the same label L are assumed to be one flat surface. Then, the identification region tracked through the process described later is output as lifting cargo W. In addition, the identification region with a largest number of pieces of point data p is output as ground surface F.

At ground object region estimation process STEP-33, a set of representative points Pr is acquired as an identification region for regions other than the identification regions set as lifting cargo W and ground surface F. Then, after ground surface F set as the identification region closest to that identification region is acquired, the average value of the height components is calculated, and it is output as ground object E when the average value difference is equal to or smaller than the height component difference of the same identification region.

Figure 8A:
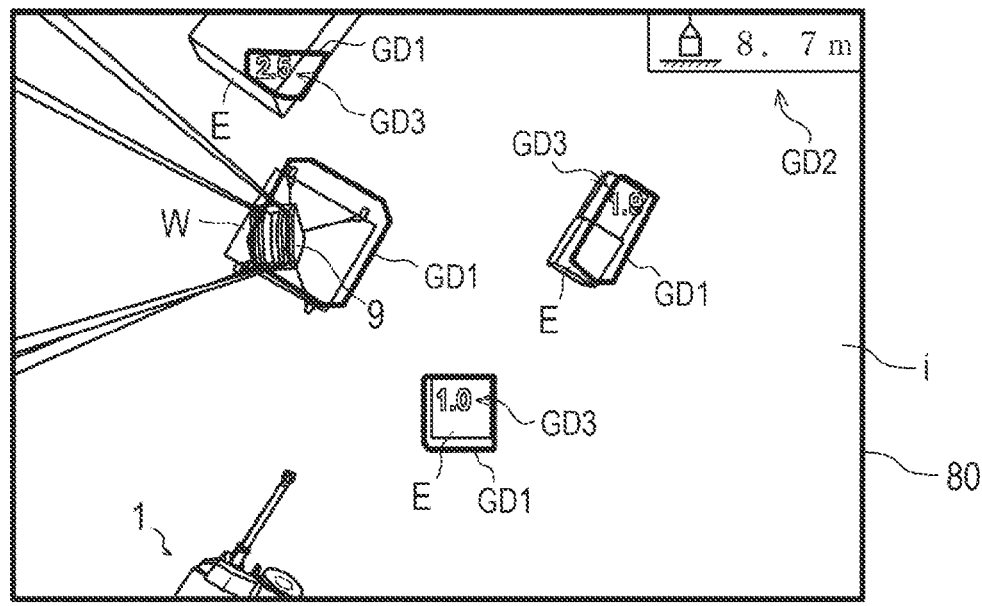
FIG. 8 is a diagram illustrating an overview of a work area visualization step.
Figure 8B:
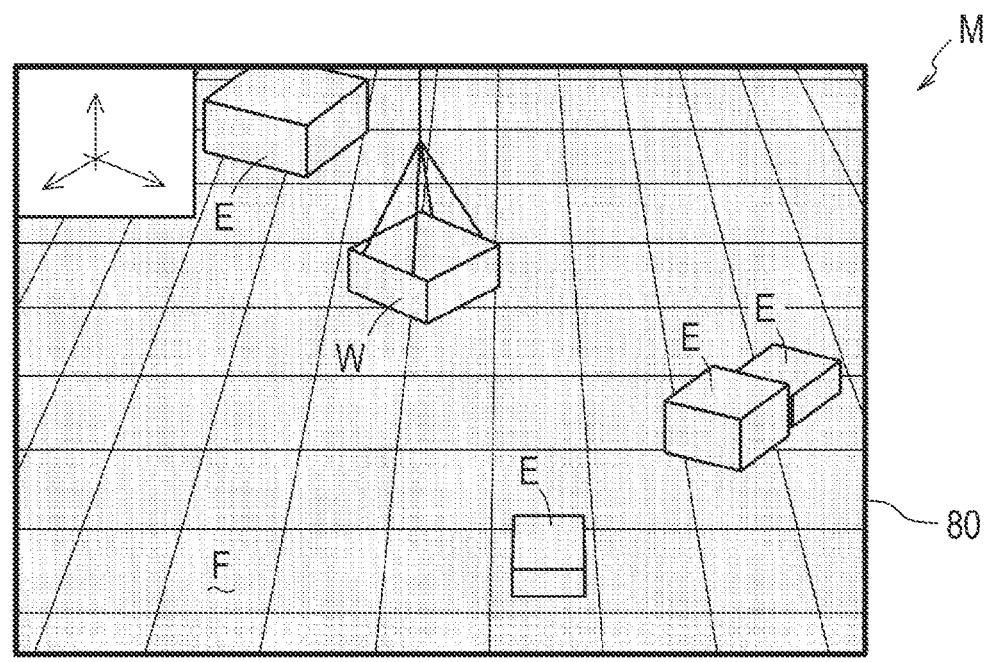

At work area visualization step STEP-4, guide information such as guide frame diagram GD1 that surrounds lifting cargo W and ground object E (including numerical values GD2 and GD3 representing the altitude) is generated, and the guide information superimposed on image i captured with camera 61 is output to data display section 80 (see FIG. 8A). In addition, three-dimensional map M representing the three-dimensional positional relationship of lifting cargo W, ground surface F and ground object E is visualized and output (see FIG. 8B).

To be more specific, work area visualization step STEP-4 is composed of region visualization process STEP-41 and three-dimensional map visualization process STEP-42.

Region visualization process STEP-41 calculates the position of lifting cargo W and ground object E in image i on the basis of the position and orientation of laser scanner 62. Then, guide frame diagram GD1 that surrounds lifting cargo W and ground object E is generated, guide frame diagram GD1 superimposed on lifting cargo W and ground object E in image i is output. In addition, numerical value GD2 representing the altitude of lifting cargo W and numerical value GD3 representing the altitude of ground object E are also output.

At three-dimensional map visualization process STEP-42, for lifting cargo W, ground surface F and ground object E provided with label L, the coordinate value of representative point Pr is acquired for each grid cell G Then, a plane with representative point Pr as the center of gravity is created for each grid cell G. At this time, the width of one side of the plane is the same as the width of grid cell G Thereafter, each of lifting cargo W, ground surface F and ground object E is colored so as to visualize it as three-dimensional map M.

Next, a procedure of same region estimation process STEP-32 is described. Note that the following description will be made on the assumption that a value (e.g., a measured value) is set to height h of lifting cargo W in the present embodiment.

As described above, data processing section 70 performs same region estimation process STEP-32 at clustering step STEP-3.

Figure 9:
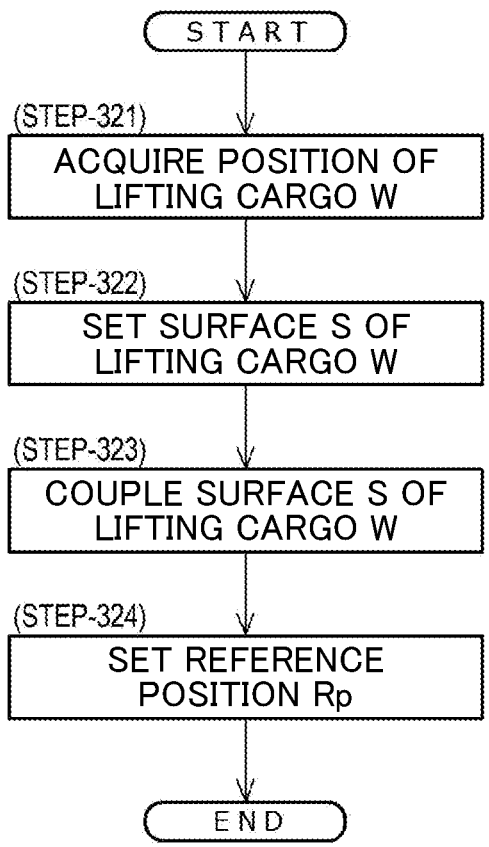
FIG. 9 is a flow chart illustrating a procedure of a same region estimation process.

As illustrated in FIG. 9, same region estimation process STEP-32 is composed of a plurality of processes. The procedure of the process described below is an example employed for this guide display device 50. It should be noted that the procedure of the process is not limitative as long as the invention described in the subject application can be achieved.

Figure 10A:
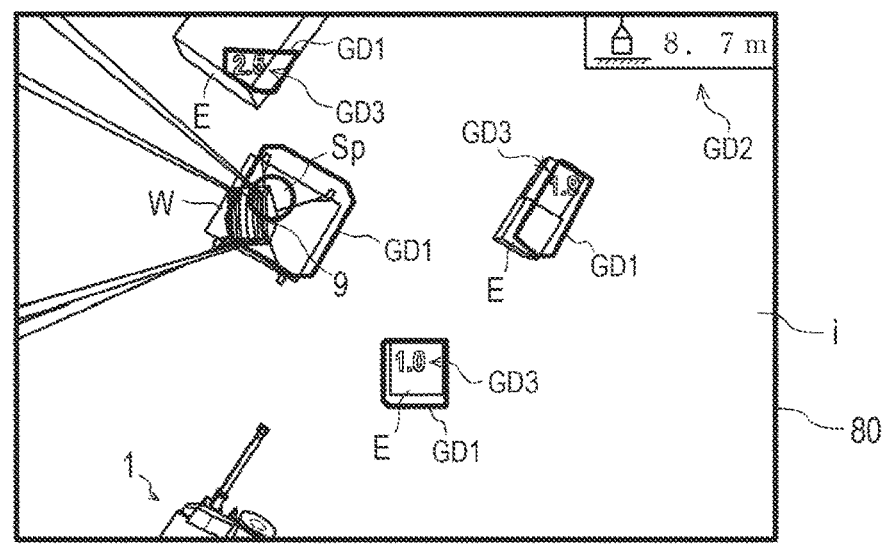
FIG. 10 is a diagram illustrating an overview of the same region estimation process.

At first process STEP-321, data processing section 70 acquires designated position Sp on image i designated by the operator through manual operation (see FIG. 10A). Then, the identification region located at designated position Sp is output as lifting cargo W. In this manner, the position of lifting cargo W in three-dimensional map M is acquired. After the position of lifting cargo W is acquired, the process proceeds to second process STEP-322.

Figure 10B:
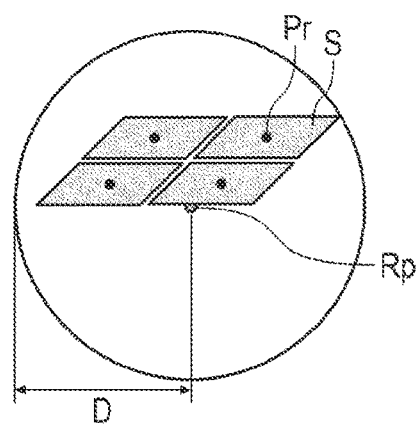

At second process STEP-322, data processing section 70 sets, as surface S of lifting cargo W, current surface S located within predetermined distance D from past reference position Rp (see FIG. 10B). Then, label L (such as newly numbered label L) is provided again to the identification region composed of surface S of lifting cargo W, and this identification region is output as lifting cargo W. Reference position Rp is a position serving as a reference for determining whether it is surface S of lifting cargo W, and is set each time when fourth process STEP-324 described later is performed (for each one frame). Past reference position Rp is reference position Rp set a predetermined time before (one frame before), for example. Current surface S is surface S included in three-dimensional map M of the newest one (current frame). Predetermined distance D is a distance serving as a reference for determining whether it is surface S of lifting cargo W, and is preferably set to a value greater than the maximum distance that should be the movement length of lifting cargo W within a predetermined time. The reason for this is to appropriately set surface S of lifting cargo W even when lifting cargo W is moved at the expected maximum speed. After setting current surface S located within predetermined distance D from past reference position Rp as surface S of lifting cargo W, the process proceeds to third process STEP-323.

Note that at second process STEP-322, in the case where past reference position Rp is not set (in the case of immediately after the acquisition of the position of lifting cargo W at first process STEP-321), surface S of the identification region of lifting cargo W output at first process STEP-321 is set as surface S of lifting cargo W.

Figure 10C:
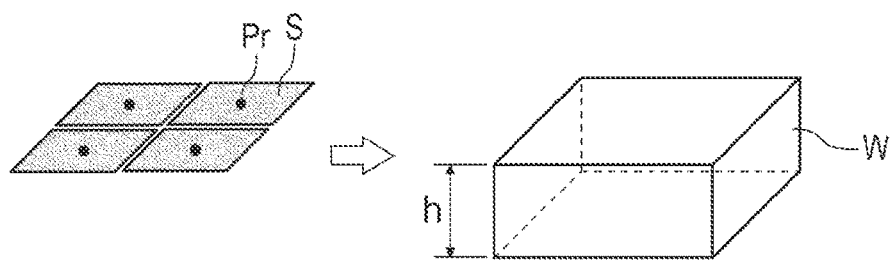

At third process STEP-323, data processing section 70 couples surface S of lifting cargo W (see FIG. 10C). At this time, by using height h of lifting cargo W, the shape of lifting cargo W in three-dimensional map M is set. After surface S of lifting cargo W is coupled, the process proceeds to fourth process STEP-324.

Figure 10D:
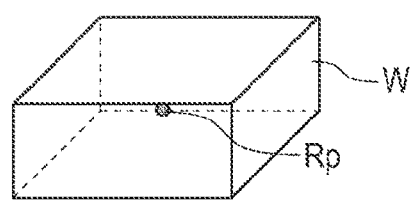

At fourth process STEP-324, data processing section 70 sets reference position Rp of lifting cargo W in three-dimensional map M (see FIG. 10D). For example, reference position Rp is set to the inside or the surface of lifting cargo W in three-dimensional map M.

At same region estimation process STEP-32 after reference position Rp is set, data processing section 70 does not perform first process STEP-321, but performs second process STEP-322 to fourth process STEP-324. That is, second process STEP-322 to fourth process STEP-324 are repeated for each one frame.

Figure 14:
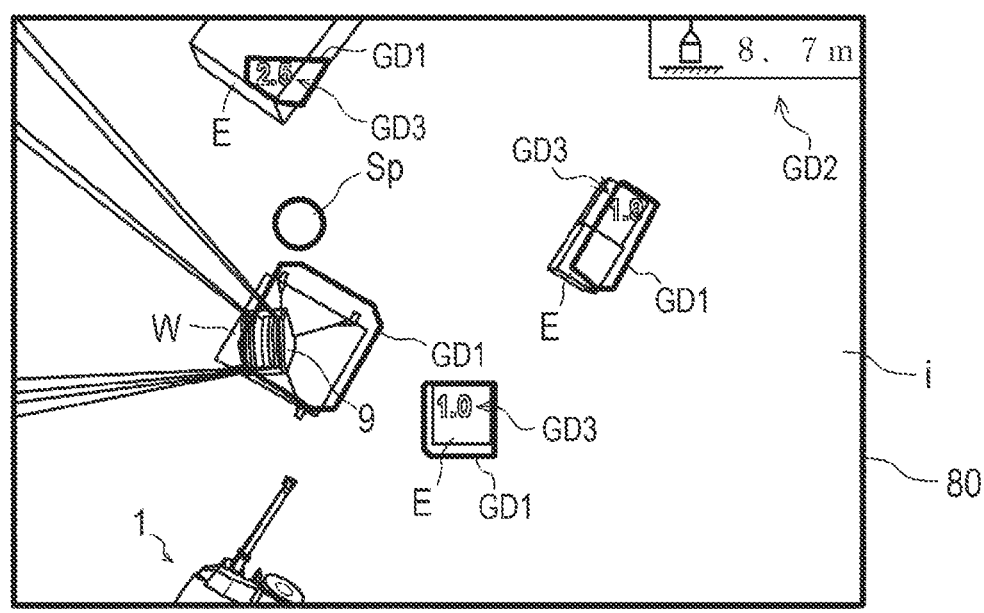
FIG. 14 is a diagram illustrating guide information generated through the same region estimation process.

As illustrated in FIG. 14, data processing section 70 can display guide information (guide frame diagram GD1 and numerical value GD2 representing the altitude of lifting cargo W) for lifting cargo W even when lifting cargo W is deviated from designated position Sp due to large sway of lifting cargo W and the like. More specifically, when designated position Sp is located on lifting cargo W (see FIG. 10A), data processing section 70 acquires the position of lifting cargo W in three-dimensional map M on the basis of designated position Sp at first process STEP-321. Thereafter, data processing section 70 sets surface S of lifting cargo W, couples surface S of lifting cargo W, and sets reference position Rp for each one frame by repeating second process STEP-322 to fourth process STEP-324. In this manner, data processing section 70 tracks lifting cargo W that moves due to large sway of lifting cargo W and the like, and displays the guide information for lifting cargo W (guide frame diagram GD1 and numerical value GD2 representing the altitude of lifting cargo W).

In this manner, guide display device 50 sets reference position Rp for lifting cargo W in three-dimensional map M, and sets, as surface S of lifting cargo W, current surface S located within predetermined distance D from past reference position Rp, to thereby track lifting cargo W in three-dimensional map M. With this guide display device 50, the guide information (guide frame diagram GD1 and numerical value GD2 representing the altitude of lifting cargo W) can be displayed by tracking lifting cargo W.

Next, guide display device 50 according to a second embodiment is described. In the present embodiment, the following description will be made on the assumption that the operator has designated the designated position Sp before lifting cargo W is lifted. Note that in the following description, the same components as those of guide display device 50 according to the first embodiment are denoted with the same names and reference numerals. Differences from guide display device 50 according to the first embodiment will be mainly described below.

Figure 11:
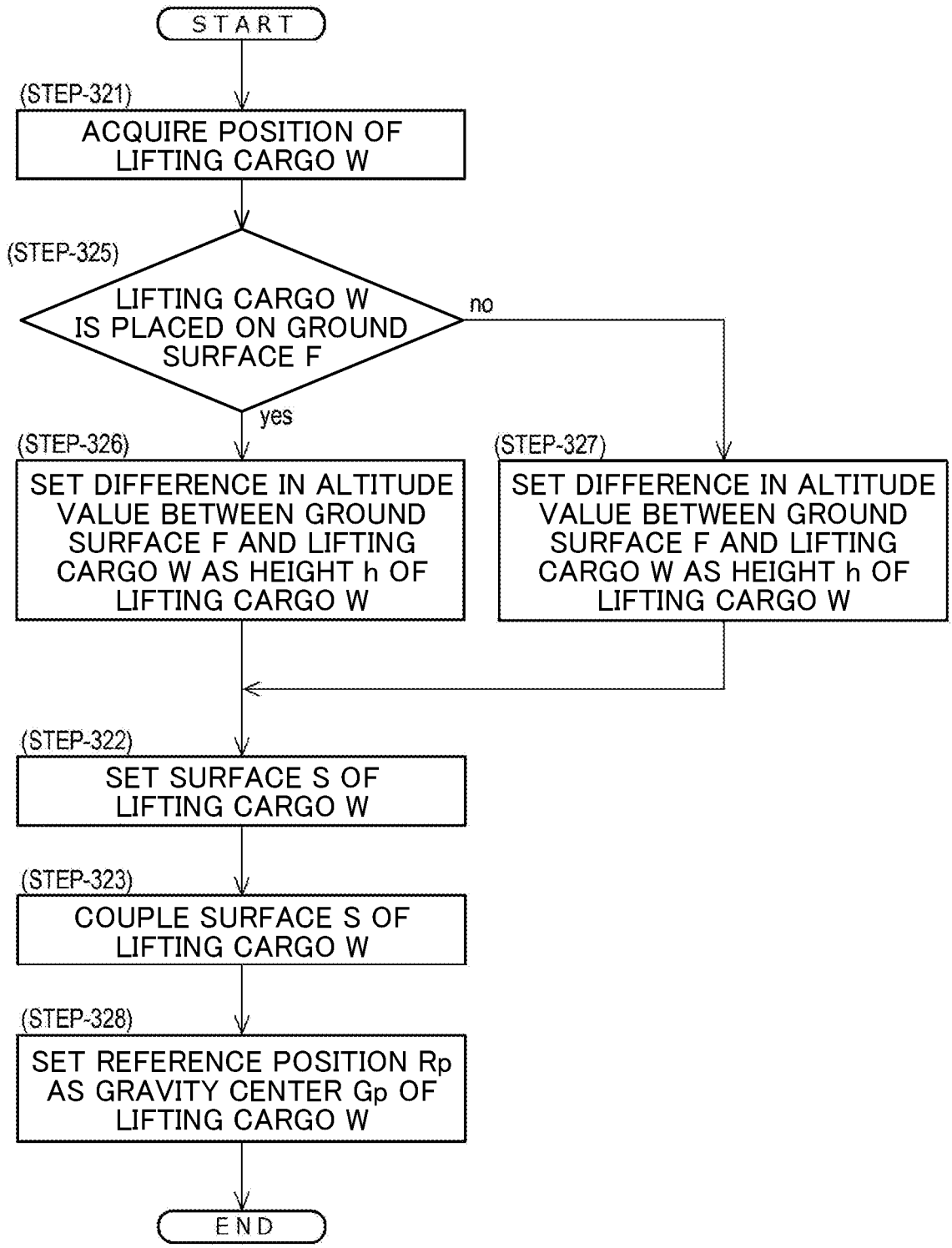
FIG. 11 is a flow chart illustrating a procedure of the same region estimation process.

As illustrated in FIG. 11, at fifth process STEP-325, data processing section 70 such as lifting cargo W is placed on ground surface F. For example, in the case where the grid cell G adjacent to the outer edge of lifting cargo W is only ground surface F in the above-described grid cells G arranged in a grid, it is determined that lifting cargo W is placed on ground surface F (see FIG. 7C). Alternatively, the operator may input the fact that lifting cargo W is placed on ground surface F to data input section 90, such that it is determined that lifting cargo W is placed on ground surface F on the basis of the input information. The process proceeds to sixth process STEP-326 when lifting cargo W is placed on ground surface F, whereas the process proceeds to seventh process STEP-327 when lifting cargo W is not placed on ground surface F.

Figure 12A:
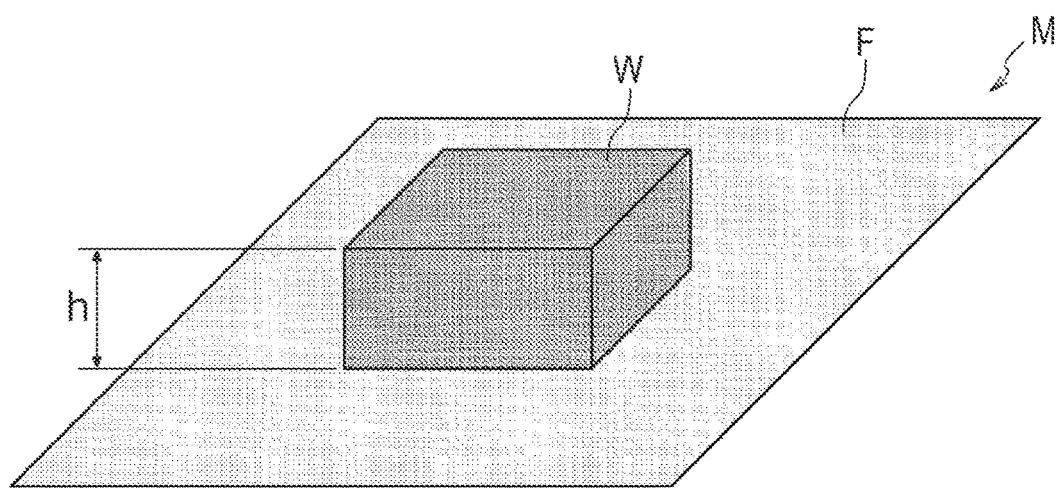
FIG. 12 is a diagram illustrating an overview of the same region estimation process.

At sixth process STEP-326, data processing section 70 sets the difference in altitude value between ground surface F and lifting cargo W in three-dimensional map M as height h of lifting cargo W (see FIG. 12A). For example, for the altitude value of ground surface F, the altitude value of ground surface F adjacent to the outer edge of the bottom surface of lifting cargo W is used. After height h of lifting cargo W is set, the process proceeds to second process STEP-322.

Figure 12B:
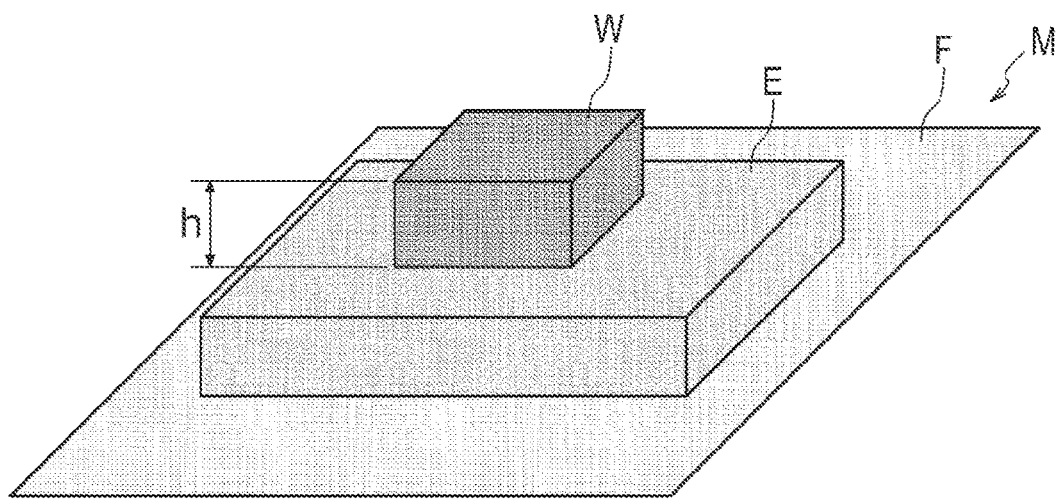

At seventh process STEP-327, data processing section 70 sets the difference in altitude value between ground object E and lifting cargo W in three-dimensional map M as height h of lifting cargo W (see FIG. 12B). For example, for the altitude value of ground object E, the altitude value of ground object E adjacent to the outer edge of the bottom surface of lifting cargo W is used. After height h of lifting cargo W is set, the process proceeds to second process STEP-322.

Figure 12C:
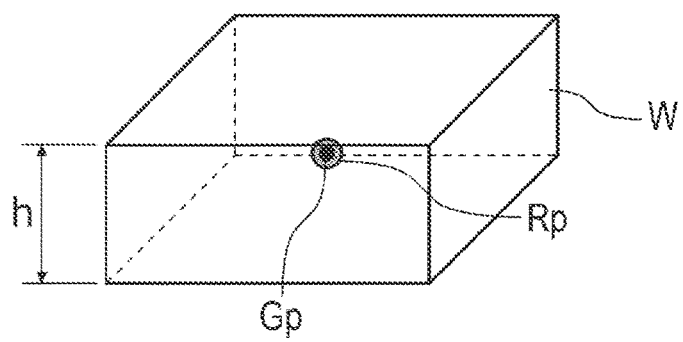

At eighth process STEP-328, data processing section 70 sets reference position Rp to gravity center Gp of lifting cargo W (see FIG. 12C). Gravity center Gp of lifting cargo W is calculated using height h of lifting cargo W.

In this manner, guide display device 50 sets reference position Rp to gravity center Gp of lifting cargo W. With this guide display device 50, surface S located within a predetermined distance D from gravity center Gp of lifting cargo W is set as surface S of lifting cargo W, and thus surface S of lifting cargo W can be more correctly set while achieving the above-described effects.

Additionally, guide display device 50 acquires point group data P including ground surface F from above ground surface F, sets the difference in altitude value between ground surface F and lifting cargo W in three-dimensional map M when lifting cargo W is placed on ground surface when as height h of lifting cargo W, and calculates gravity center Gp of lifting cargo W by using height h of lifting cargo W. With this guide display device 50, height h of lifting cargo W can be automatically set when lifting cargo W is placed on ground surface F, while achieving the above-described effects.

Additionally, guide display device 50 acquires point group data P including ground object E from above ground object E, sets, as height h of lifting cargo W, the difference in altitude value between ground object E and lifting cargo W in three-dimensional map M when lifting cargo W is placed on ground object E, and calculates gravity center Gp of lifting cargo W by using height h of lifting cargo W. With this guide display device 50, height h of lifting cargo W can be automatically set even when lifting cargo W is placed on ground object E such as the cargo bed of a truck, while achieving the above-described effects.

Next, guide display device 50 according to a third embodiment is described.

Figure 13:
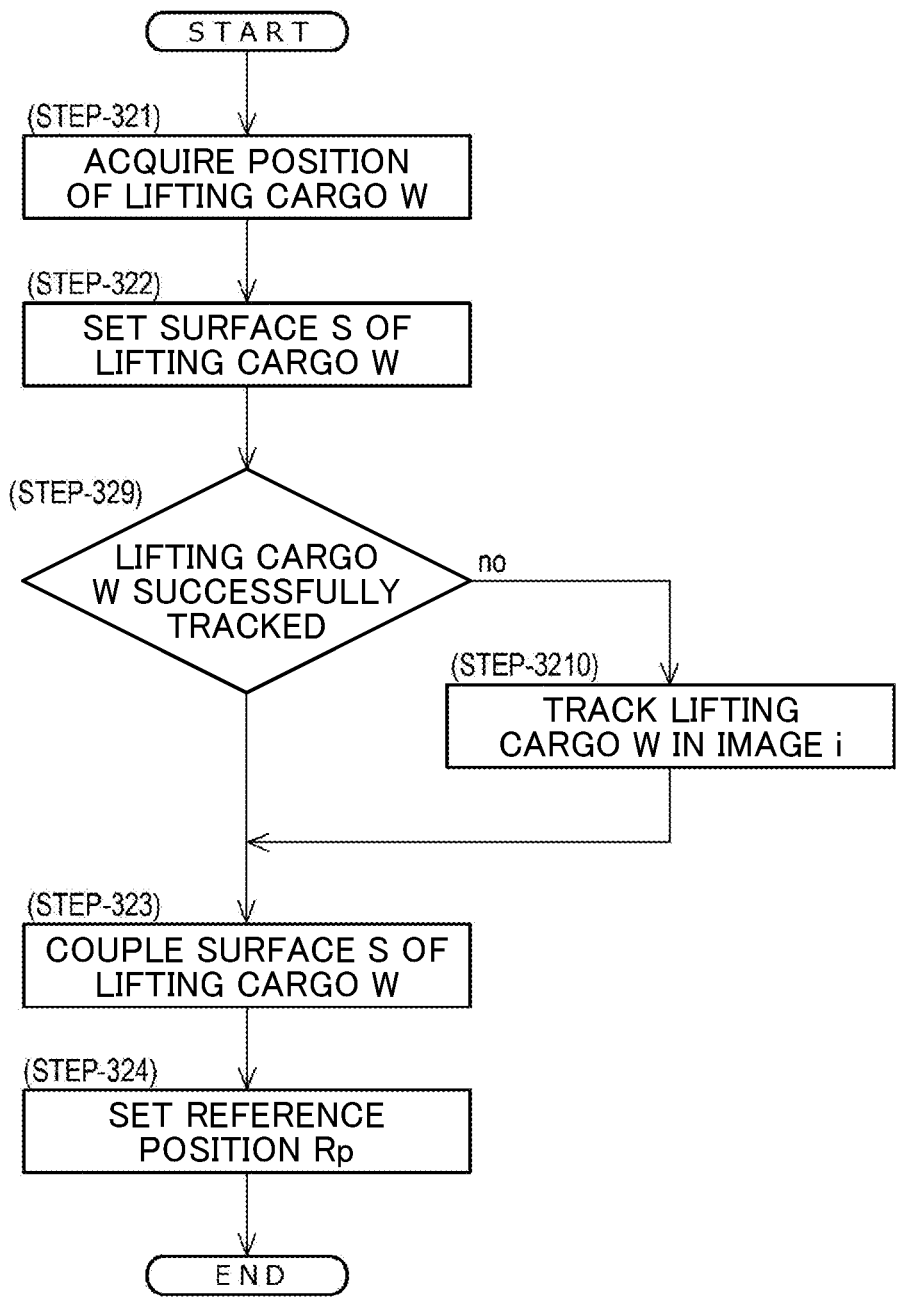
FIG. 13 is a flow chart illustrating a procedure of the same region estimation process.

As illustrated in FIG. 13, at ninth process STEP-329, data processing section 70 determines whether lifting cargo W has been tracked in three-dimensional map M. The tracking of lifting cargo W in three-dimensional map M may fail in the case where lifting cargo W is not irradiated with laser light and there is no surface S located within predetermined distance D from reference position Rp, and the like, for example. Specifically, it is determined that the tracking of lifting cargo W in three-dimensional map M has failed in the case where there is no surface S located within predetermined distance D from reference position Rp and the like. The process proceeds to third process STEP-323 when lifting cargo W in three-dimensional map M can be tracked, whereas the process proceeds to tenth process STEP-3210 when the tracking of lifting cargo W in three-dimensional map M has failed.

At tenth process STEP-3210, data processing section 70 tracks lifting cargo W in image i through image analysis. Then, by setting image i and three-dimensional map M in association with each other, surface S of lifting cargo W in three-dimensional map M is set. For example, as the tracking method using image analysis, a channel and spatial reliability tracking (CSRT) method using a machine learning algorithm and the like may be employed. After lifting cargo W is tracked, the process proceeds to third process STEP-323.

In this manner, guide display device 50 includes camera 61 that captures image i including lifting cargo W from above lifting cargo W, and when the tracking of lifting cargo W in three-dimensional map M has failed, lifting cargo W in image i is tracked through image analysis. With this guide display device 50, guide information (guide frame diagram GD1 and numerical value GD2 representing the altitude of lifting cargo W) can be displayed by tracking lifting cargo W even when point group data P of lifting cargo W cannot be acquired, while achieving the above-described effects.

Finally, the subject of the invention may be considered to be crane 1 including guide display device 50, as well as guide display device 50.

Specifically, crane 1 includes guide display device 50. With such a crane 1, an effect similar to the above-described effect can be achieved.

INDUSTRIAL APPLICABILITY

The present invention is applicable to a guide display device and a crane including the same.

REFERENCE SIGNS LIST

1 Crane
50 Guide display device
60 Data acquiring section
61 Camera
62 Laser scanner
63 Inertia measurement unit (IMU)
64 First positioning apparatus (GNSS receiver)
65 Second positioning apparatus (GNSS receiver)
66 Sensor unit
70 Data processing section
80 Data display section 90 Data input section
D Predetermined distance
E Ground object
F Ground surface
G Grid
GD1 Guide information (Guide frame diagram)
GD2 Guide information (Numerical value representing altitude of lifting cargo)
Gp Gravity center
H Height of lifting cargo
I Image
M Three-dimensional map
P Point group data
P Point data
Pr Representative point
Rp Reference position
S Surface
W Lifting cargo

The invention claimed is:

1. A guide display device of a crane, comprising:
a data processing section configured to create a plurality of planes by using point group data including a lifting cargo acquired with a laser scanner from above the lifting cargo, create a three-dimensional map with the plurality of planes, and create the three-dimensional map at a predetermined time interval,
wherein the data processing section sets a reference position to the lifting cargo in the three-dimensional map, and
wherein the data processing section tracks the lifting cargo in the three-dimensional map by setting a current plane located within a predetermined distance from a past reference position as a surface of the lifting cargo.

2. The guide display device according to claim 1, wherein the data processing section sets the reference position to a gravity center of the lifting cargo.

3. The guide display device according to claim 2,
wherein the point group data is data including the ground surface acquired with the laser scanner from above the ground surface, and
wherein the data processing section sets, as a height of the lifting cargo, a difference in an altitude value between the ground surface and the lifting cargo in the three-dimensional map when the lifting cargo is placed on the ground surface, and calculates the gravity center of the lifting cargo by using the height of the lifting cargo.

4. The guide display device according to claim 2,
wherein the point group data is data including a ground object acquired with the laser scanner from above the ground object; and
wherein the data processing section sets, as the height of the lifting cargo, the difference in the altitude value between the ground object and the lifting cargo in the three-dimensional map when the lifting cargo is placed on the ground object, and calculates the gravity center of the lifting cargo by using the height of the lifting cargo.

5. The guide display device according to claim 1, wherein when tracking of the lifting cargo in the three-dimensional map fails, the data processing section tracks, through image analysis, the lifting cargo in an image including the lifting cargo captured with a camera from above the lifting cargo.

6. A crane comprising the guide display device according to claim 1.

* * * * *